United States Patent
Patel et al.

(10) Patent No.: US 11,253,832 B2
(45) Date of Patent: Feb. 22, 2022

(54) CATALYTIC CRACKING SYSTEM WITH BIO-OIL PROCESSING

(71) Applicants: Spraying Systems Co., Wheaton, IL (US); Technip Process Technology, Inc., Houston, TX (US)

(72) Inventors: Bandish Patel, Carol Stream, IL (US); Digna Boatman, Plainfield, IL (US); Eusebius Anku Gbordzoe, Houston, TX (US)

(73) Assignee: Spraying Systems Co., Wheaton, IL (US)

(*) Notice: Subject to any disclaimer, the term of this patent is extended or adjusted under 35 U.S.C. 154(b) by 0 days.

(21) Appl. No.: 16/926,382

(22) Filed: Jul. 10, 2020

(65) Prior Publication Data
US 2021/0008517 A1    Jan. 14, 2021

Related U.S. Application Data

(60) Provisional application No. 62/872,965, filed on Jul. 11, 2019.

(51) Int. Cl.
| | |
|---|---|
| *B01J 8/22* | (2006.01) |
| *B01J 8/00* | (2006.01) |
| *B01J 8/18* | (2006.01) |
| *B01J 8/24* | (2006.01) |
| *B01J 4/00* | (2006.01) |

(52) U.S. Cl.
CPC .............. *B01J 8/22* (2013.01); *B01J 4/002* (2013.01); *B01J 8/0025* (2013.01); *B01J 8/1845* (2013.01); *B01J 8/24* (2013.01); *B01J 2204/007* (2013.01); *B01J 2208/00752* (2013.01); *B01J 2208/00902* (2013.01)

(58) Field of Classification Search
CPC ... B01J 8/22; B01J 4/002; B01J 8/0025; B01J 8/1845; B01J 8/24; B01J 2204/007; B01J 2208/00752; B01J 2208/00902; B01J 2208/00318; B01J 2208/00946; B01J 2208/00823; B01J 8/1863; B01J 2204/002; B01J 8/26; B01J 8/1818; Y02P 30/20; B05B 7/0475; C10G 3/42; C10G 3/57; C10G 11/18
USPC ..................................................... 422/214
See application file for complete search history.

(56) References Cited

U.S. PATENT DOCUMENTS

| | | | | |
|---|---|---|---|---|
| 5,087,349 A | * | 2/1992 | Goelzer | C10G 11/18 208/113 |
| 7,036,753 B2 | * | 5/2006 | Huffman | B05B 7/0466 239/427 |

\* cited by examiner

*Primary Examiner* — Huy Tram Nguyen
(74) *Attorney, Agent, or Firm* — Leydig, Voit & Mayer, Ltd.

(57) ABSTRACT

A catalytic cracking system in which liquid hydrocarbon and bio-oil are directed into a reactor riser of a fluid catalytic cracking unit by separate feed spray nozzle assemblies. To protect liquid bio-oil directed through the liquid bio-oil feed nozzle assembly from high temperature degradation, an insulating layer is provided between a central bio-oil feed tube in a concentrically surrounding atomizing gas passageway. Cooling channels also may be provided in the spray tip of the bio-oil feed nozzle assembly.

20 Claims, 3 Drawing Sheets

CATALYTIC CRACKING SYSTEM WITH BIO-OIL PROCESSING

CROSS-REFERENCE TO RELATED APPLICATIONS

This patent application claims the benefit of U.S. Provisional Patent Application No. 62/872,965, filed Jul. 11, 2019, which is incorporated by reference.

FIELD OF THE INVENTION

The present invention relates generally to catalytic cracking systems, and more particularly, to spray nozzle assemblies adapted for atomizing and spraying a bio-oil liquid feed into a fluidized catalytic cracking reactor.

BACKGROUND OF THE INVENTION

Fluidized catalytic cracking processing is important in the petroleum refinery industry and is used world-wide to convert heavy hydrocarbons into products such as liquefied petroleum gas, gasoline, and diesel fuel. Renewable energy sources, such as bio-oil produced from fast pyrolysis of bio-oils like pine woodchips, corn cobs, other plant and organic material, and vegetable oils are becoming increasingly important as an alternative or supplement to crude oil as a processing fuel. The fluid catalytic cracking (FCC) process can similarly be used to produce hydrocarbon fuels from bio-oil. Desirable results can be obtained when the bio-oil is co-processed with the feed of crude oil. Because of the instability of the bio-oil to temperature, care must be taken in injecting the bio-oil into the riser of the FCC. Subjecting the bio-oil to high temperatures could cause premature polymerization of the bio-oil and pluggage of the nozzle.

OBJECTIVES AND SUMMARY OF THE INVENTION

It is an object of the present invention to provide a reliable, non-plugging and effective bio-oil atomization and injection system for co-processing bio-oil with hydrocarbon feedstock in a fluid catalytic cracking system.

Another object is to provide a bio-oil feed assembly that can be effectively operated at reasonable temperatures associated with steam, fuel gas, nitrogen and other gas atomization of the bio-oil at operating temperatures associated with catalytic cracking systems.

A further object is to provide a bio-oil feed nozzle assembly of the above kind in which the liquid bio-oil feed is maintained at an optimum temperature below its polymerization or decomposition temperature for efficient atomization into catalyst inside FCC riser, and direction while being transferred simultaneously with hot steam or other atomizing gas through even relatively long length feed nozzles, such as up to two and six feet in length.

Still another object is to provide a spray nozzle assembly of the foregoing type which meets all the requirements for preserving the integrity of the bio-oil and is relatively simple in construction and lends itself to economical manufacture.

Other objects and advantages of the invention will become apparent upon reading the following detailed description and upon reference to the drawings, in which:

Figure 1:
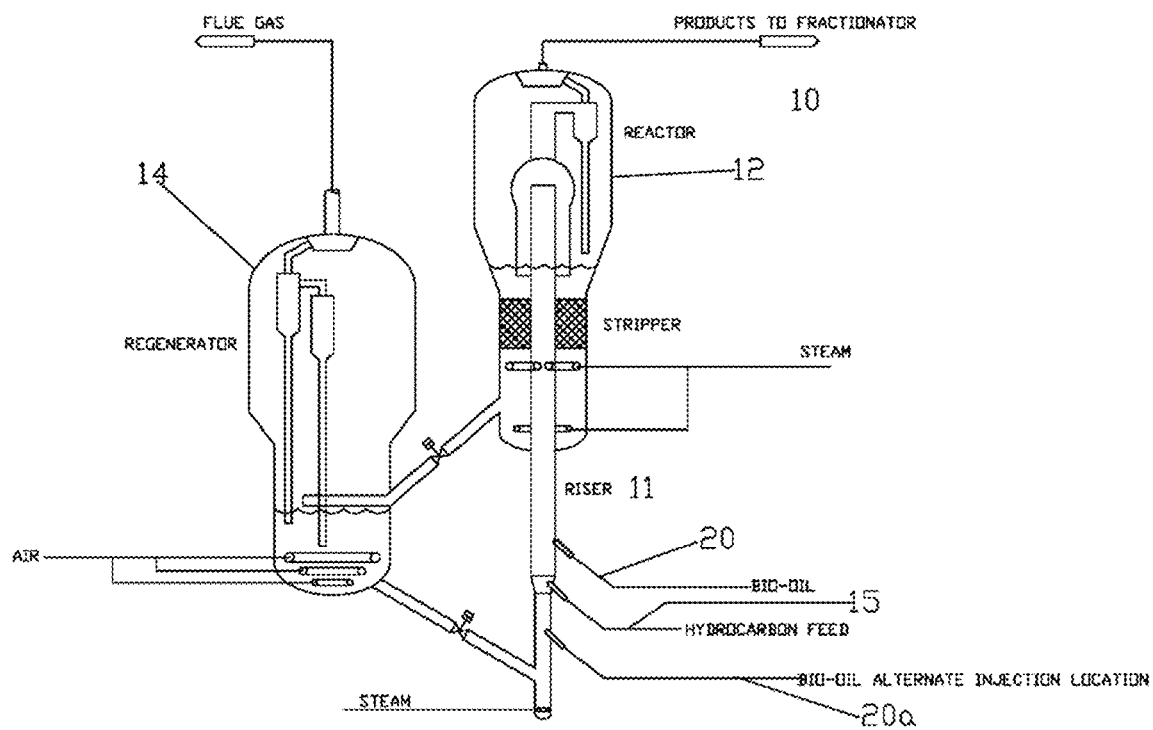
FIG. 1 is a diagrammatic depiction of an illustrative fluidized catalytic cracking system operable for simultaneously injecting both crude oil and bio-oil feeds into a catalytic cracking riser.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENT

Referring now more particularly to FIG. 1 of the drawings, there is shown an illustrated fluid catalytic cracking system 10 operable for atomizing and directing both crude oil and bio-oil into a riser 11 of a catalytic cracking reactor 12. As is known in the art, the system 10 comprises the reactor 12 and a regeneration unit 14. In such system, catalyst particles are brought into contact with a liquid hydrocarbon such as crude oil that is atomized and directed into an entrance of the riser 11 by a liquid hydrocarbon feed nozzle 15. The crude oil feed nozzle 15, may be of a conventional type, such as depicted in U.S. Pat. Nos. 5,921,472 and 8,820,663 assigned to the same assignee as the present application, the disclosures of which are incorporated herein by reference. Thorough atomization of the hydrocarbon feed is critical for contacting the hydrocarbon feed with catalyst particles because a uniform and narrow distribution of droplet sizes assist in faster vaporization of the hydrocarbon, reducing formation of undesirable coke, and enabling more effective product yield. Steam is typically used as the atomizing gas and hot catalyst particles coming from the regeneration unit 14 evaporate the feed oil upon contact in the riser 11, initiating the cracking as the oil vapors, the steam and catalyst particles move upwardly in the riser 11. The temperature of the catalyst particles drop as the evaporation of oil and endothermic cracking reactions proceed during the upward movement. The cracking reaction deposits coke on the catalyst, leading to the deactivation of the catalyst. The catalyst is separated from the vapor mixture at the top of the riser located inside the reactor 12 mixed with steam and hydrocarbon mixture from the catalyst stripper and sent to a fractionator. The separated coked catalyst is stripped with steam in the catalyst stripper before the coked catalytic is sent to the regeneration unit 14 to burn off the coke with air. The heat released from the burning of the coke deposit increases the temperature of the catalyst particles that are returned to the riser to supply the heat needed for the cracking reaction and the cycle is repeated.

As indicated above, renewable energy sources, such as bio-oil produced from bio-oils are becoming increasingly important as an alternative and supplement to hydrocarbon feed in catalytic processing. Injecting bio-oil through the feed nozzle 15 designed for injecting hydrocarbon feed into the FCC unit has been found to be undesirable as the bio-oil tends decompose, generate coke and cause plugging, hindering efficient atomization and direction of the bio-oil into the riser.

Figure 2:
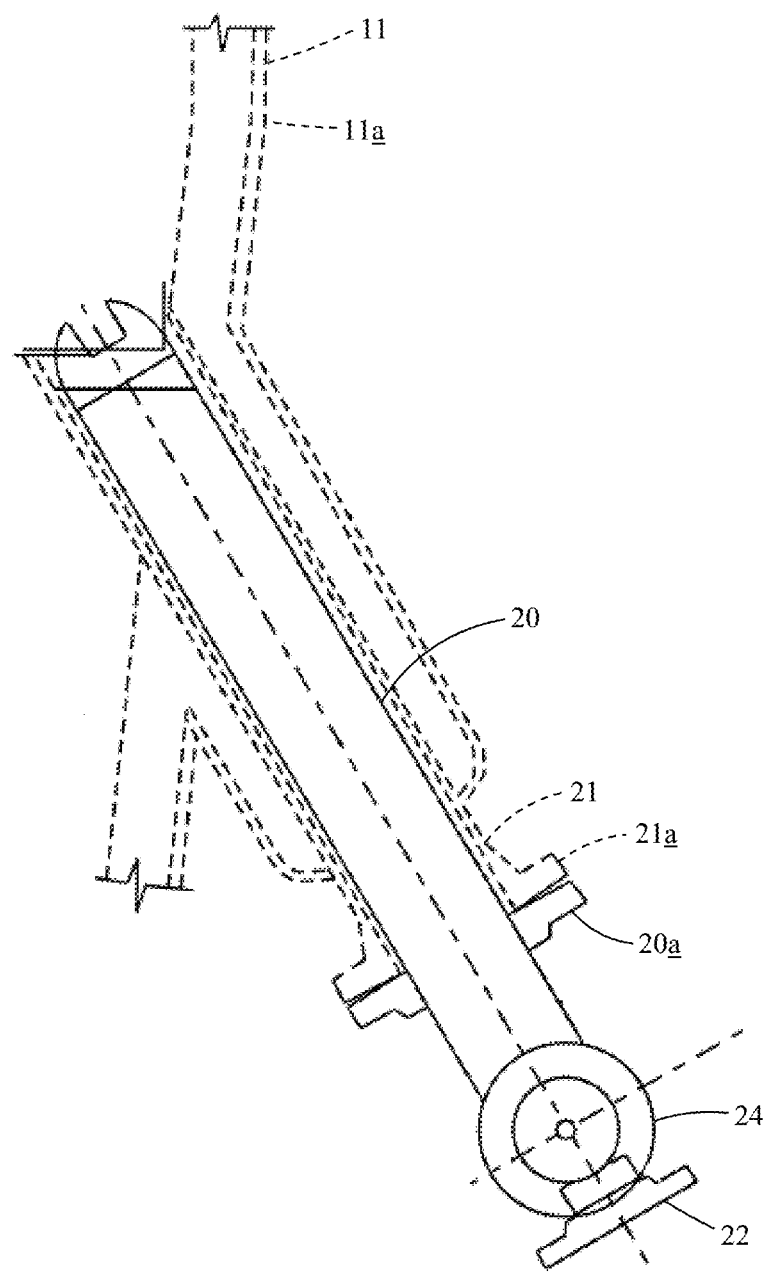
FIG. 2 is a depiction of a bio feed nozzle assembly according to the present invention mounted within the wall of the riser of the catalytic cracking riser.
Figure 3:
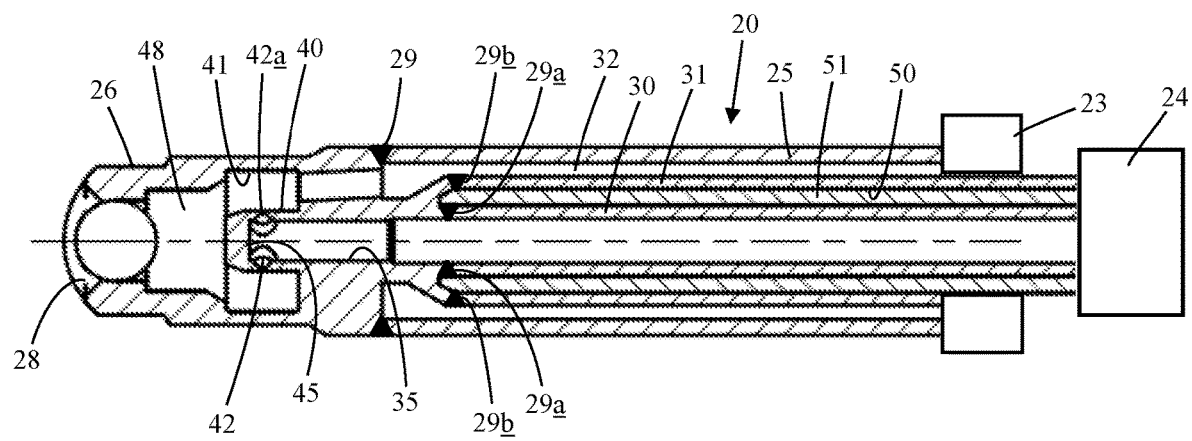
FIG. 3 is an enlarged longitudinal section of the bio-oil feed spray nozzle assembly of the present invention.

In carrying out the present embodiment, a bio-oil feed nozzle assembly 20 separate and different from the hydrocarbon feed nozzle 15 is provided for more efficiently atomizing and directing a liquid bio-oil feed into the riser 11 of the FCC unit with a similar liquid particle breakdown as the liquid hydrocarbon oil feed. The illustrated bio-oil feed nozzle assembly 20, like the hydrocarbon feed nozzle 15, is mounted in a conventional manner in an insulated wall 11a of the riser 11 of the fluidized catalytic reactor 12. The bio-oil feed nozzle 20 in this case is supported in a tubular sleeve 21 fixed within the wall 11a at an angle to the vertical for discharging atomized liquid bio-oil upwardly into the riser 11. The tubular sleeve 21 has an outwardly extending flange 21a to which a support flange 20a fixed to the bio-oil feed nozzle assembly 20 may be secured. The bio-oil feed nozzle assembly 20 has a liquid bio-oil inlet 22 for connection to a liquid bio-oil supply 24, diagrammatically depicted in FIGS. 2 and 3, and atomizing gas inlet 24 for connection to an atomizing gas supply 23, such as steam, fuel gas processed in the refinery, nitrogen, natural gas and the like, also diagrammatically in FIGS. 2 and 3. While the illustrated bio-oil feed nozzle assembly 20 is disposed upstream of the hydrocarbon feed nozzle 15, alternatively a bio-oil feed nozzle assembly 20a could be disposed upstream of the hydrocarbon feed.

The bio-oil feed nozzle assembly 20 in this case includes an elongated outer body or pipe section 25 that extends substantially the length of the feed nozzle assembly 20. Due to the thickness of the riser wall 11a, and the incline mounting of the feed nozzle assembly 20, the outer body 25 typically has a relatively long length in a range from about two to six feed depending on the size of the FCC unit. A spray tip 26 having a discharge orifice 28, in this case in the form of a cross cut, is secured in an abutting relation to the downstream end of the outer body 25, such as by a weldment 29.

A bio-oil feed tube 30 is centrally supported within the outer body 25 having an upstream end communicating with the liquid bio-oil supply 24. An intermediate tube or pipe section 31 in this instance is concentrically supported in surrounding relation to the bio-oil feed tube 30, with the outer surface of the intermediate tube 31 and the inner surface of the outer body 25 defining an annular atomizing gas passage 32 having an upstream end communicating with the atomizing gas supply 23. Downstream ends of the bio-oil feed tube 30 and the intermediate tube 31 in this case similarly are secured to the spray tip 26 by weldments 29a, 29b, respectively.

The illustrated bio-oil feed tube 30 communicates with a central liquid flow passage 35 of the spray tip 26 that extends into a protruding generally cylindrical liquid directing nose 40 disposed centrally within an enlarged diameter mixing chamber 41 defined within the spray tip 26 in surrounding relation to the nose 40. The central liquid passage 35 communicates with a plurality of cross holes 42, in this case four in number, extending perpendicular to and in intersecting relation with a central axis of the spray tip central liquid flow passage 35. While the illustrated liquid directing nose in this case is an integral part of the spray tip 26, it will be understood that alternatively it could be an extension of the bio-oil feed tube 30.

Pressurized liquid bio-oil directed through the central bio-oil supply tube 30 and passage 35 strikes an end wall 45 at a downstream end of the central passage 35, in this case defined in part by the cross holes 42. As pressurized liquid bio-oil impinges upon the end wall 45, it is broken down into liquid particles and directed radially outwardly through discharge orifices 42a of the cross holes 42.

Simultaneously, pressurized atomizing gas is directed through the annular atomizing gas passage 32 into the mixing zone 41 of the spray tip 26 transversely across the respective radial discharge orifices 42a further breaking up and atomizing the transversely directing bio-oil streams. The atomized bio-oil particles internally atomized within the spray tip 26 are thereupon directed at high velocity into a downstream expansion chamber 48 of the spray tip 26 for further breakdown and atomization as an incident to discharge through the spray tip discharge orifice 28. The expansion chamber 48 in this case is slightly smaller in diameter than the upstream mixing zone 41 and has a relatively short axial less than its diameter.

In keeping with an important aspect of the present embodiment, the bio-oil feed nozzle assembly 20 is designed to shield the liquid bio-oil flow stream within the feed nozzle assembly from overheating from the temperature of the simultaneously directed atomizing gas and surrounding temperatures of the catalytic cracking system. To this end, an insulating layer is provided between the bio-oil feed tube 30 and the annular atomizing gas passage 32 for insulating the liquid bio-oil directed through the feed tube 30 from high temperature exposure. In the illustrated embodiment, the central bio-oil feed tube 30 and intermediate tube 31 define an annular space 50 therebetween for retaining insulation 51 along a substantial length of the bio-oil feed tube 30 which shields the passing liquid bio-oil from the surrounding heat of the system. The insulation 51 preferably is a microporous insulation which allows very low thermal conductivity of the high temperature of steam or other atomizing gas directed through the annular atomizing gas passage 32 surrounding the liquid bio-oil feed tube 30 along the relatively long outer body 25. The insulation material preferably is a granular microporous powder, variable in size between about 0.3-2.25 mm. Such microporous materials have been found effective for preventing significant heat transfer across even the radial space of the cavity 51 between the bio-oil feed tube 30 and the intermediate tube 31 is relatively small. Such temperature control of the bio-oil occurs substantially along its entire passage through the bio-oil feed tube 30 before direction into the spray tip mixing chamber 41. Since the liquid bio-oil is effectively shielded from the high temperatures in the surrounding annular atomizing gas passage 32 it unexpectedly has been found that the liquid bio-oil may be maintained within an optimum temperature range of about 40° C. to 70° C. upon entry into the mixing chamber 41, for effecting atomization and direction of the liquid bio-oil from the feed nozzle assembly 20 with droplet size distributions consistent with that of crude oil discharging from the hydrocarbon spray nozzle.

Figure 4:
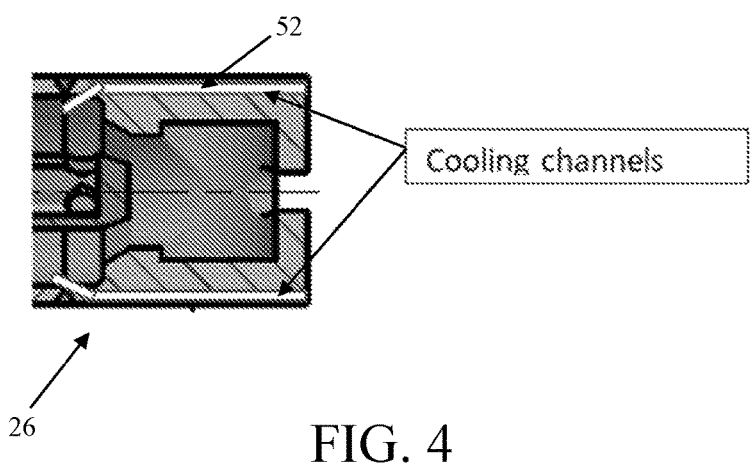
FIG. 4 is an enlarged section of an alternative form of spray tip for the illustrated bio-oil feed spray nozzle assembly with cooling channels for cooling the discharging liquid bio-oil.

Alternatively, as depicted in FIG. 4, the spray tip 26 may be formed with plurality of longitudinally extending cooling channels 52 about its periphery communicating with the atomizing gas passage 32 for directing atomizing gas about the periphery of the spray tip to further reduce the tip temperature. Other forms of spray tips could also be used.

From the foregoing, it can be seen that a catalytic cracking system is provided that is adapted for more efficient and effective atomization and use of bio-oil in catalytic cracking units. The liquid bio-oil is effectively shielded from high temperature atomizing gas during passage through the feed nozzle assembly for optimum atomization and discharge from the feed nozzle into the riser of the FCC unit consistent with the atomization and direction of feed from the hydrocarbon feed nozzle.

The invention claimed is:

1. A catalytic cracking system comprising:
a catalytic cracking reactor;
a riser communicating upwardly to said catalytic cracking reactor;
a supply of a liquid hydrocarbon;
a first feed spray nozzle assembly mounted in and extending through a wall of said riser and having a first spray tip at a downstream end, said first feed spray nozzle assembly having an upstream end coupled to the supply of liquid hydrocarbon and a supply of atomizing gas such that liquid hydrocarbon directed through said first feed spray nozzle assembly is atomized by the atomizing gas and discharged from said first spray tip into riser as a finely atomized liquid hydrocarbon spray;
a second feed spray nozzle assembly comprising an elongated nozzle body mounted in and extending through the wall of said catalytic cracking riser and having a second spray tip at a downstream end;
a bio-oil feed tube supported within the elongated nozzle body having an upstream end connected to a supply of a liquid bio-oil for directing liquid bio-oil through bio-oil feed tube to said second spray tip;
said elongated nozzle body defining an annular atomizing gas passage in surrounding relation to said bio-oil feed tube; said annular atomizing gas passage being connected to a supply of atomizing gas for direction through said annular atomizing gas passage for atomizing liquid bio-oil discharging from the liquid feed tube and spray tip into a fine particle liquid bio-oil spray; and
an annular insulating layer between said bio-oil feed tube and said atomizing gas passage for insulating liquid bio-oil directed through said bio-oil feed tube from the heat of atomizing gas directed through said atomizing gas passage.

2. The catalytic cracking system of claim 1 in which said annular atomizing gas passage is defined between said elongated nozzle body and an intermediate tubular member concentrically supported about said bio-oil feed tube; said intermediate tubular member and bio-oil feed tube defining an elongated annular space therebetween about said bio-oil feed tube; and said insulation layer being disposed within said elongated annular space between said bio-oil feed tube and said intermediate tubular member.

3. The catalytic cracking system of claim 2 in which said insulation layer comprises a microporous insulation or equivalent.

4. The catalytic cracking system of claim 3 in which said insulation layer comprises a granular microporous powder with powder particle size between 0.3-2.25 mm.

5. The catalytic cracking system of claim 1 in which said insulation layer maintains the temperature of liquid bio-oil transferred through the bio-oil feed tube within a temperature range of 40° C. and 70° C.

6. The catalytic cracking system of claim 1 in which said second spray tip defines an internal mixing chamber, a bio-oil liquid directing nose disposed within said mixing chamber communicating with said bio-oil feed tube, said liquid directing nose being formed with a plurality of radial discharge passages for transversely directing bio-oil directed through said bio-oil feed tube radially outwardly into said mixing chamber for break up and atomization of by atomizing gas directed from said atomizing gas passage into said mixing chamber.

7. The catalytic cracking system of claim 6 in which said radial discharge passages define an end wall within said liquid directing nose against which pressurized liquid bio-oil impinges is broken down into liquid droplets and directed radially outwardly into said mixing chamber.

8. The catalytic cracking system of claim 7 in which said second spray tip includes an expansion chamber downstream of said mixing chamber into which liquid bio-oil is directed for further breakdown and atomization as an incident to discharge from a discharge orifice of the spray tip.

9. The catalytic cracking system of claim 1 in which said second spray tip is formed with longitudinally extending cooling channels about its periphery communicating with the atomizing gas supply for directing atomizing gas about the spray tip for cooling the spray tip from radiation of hot catalyst.

10. The catalytic cracking system of claim 1 in which said elongated nozzle body has a length of between 2 and 6 feet.

11. The catalytic cracking system of claim 1 in which the supply of atomizing gas to which the atomizing gas passage of said second feed spray nozzle assembly is connected is a supply of steam.

12. The catalytic cracking system of claim 1 in which the supply of atomizing gas to which the atomizing gas passage of said second feed spray nozzle assembly is connected is a supply of pressurized fuel gas, nitrogen, or natural gas.

13. A feed spray nozzle assembly for directing liquid bio-oil into a riser of a catalytic cracking system comprising:
an elongated nozzle body for mounting within and extending through a wall of a catalytic cracking riser and having a spray tip at a downstream end;
a bio-oil feed tube supported within the elongated nozzle body having an upstream end connected to a supply of a liquid bio-oil for directing liquid bio-oil through bio-oil feed tube to said spray tip;
said elongated nozzle body defining an annular atomizing gas passage in surrounding relation to said bio-oil feed tube; said annular atomizing gas passage being connected to a supply of atomizing gas for direction through said annular atomizing gas passage for atomizing liquid bio-oil discharging from the bio-oil feed tube and spray tip into a fine particle liquid bio-oil spray;
an intermediate tubular member concentrically supported about said bio-oil feed tube; said intermediate tubular member and bio-oil feed tube defining an elongated annular space therebetween about said bio-oil feed tube; and
an insulation layer being disposed within said elongated annular space between said bio-oil feed tube and said intermediate tubular member for insulating liquid bio-oil directed through said bio-oil feed tube from the heat of atomizing gas directed through said atomizing gas passage.

14. The feed spray nozzle assembly of claim 13 in which said insulation layer comprises a microporous insulation.

15. The feed spray nozzle assembly of claim 14 in which said insulation layer comprises a granular microporous powder with powder particle size between 0.3-2.25 mm.

16. The feed spray nozzle assembly of claim 13 in which said insulation layer maintains the temperature of liquid bio-oil transferred through the bio-oil feed tube within a temperature range of 40° C. and 70° C.

17. The feed spray nozzle assembly of claim 13 in which said elongated nozzle body has a length of between 2 and 6 feet.

18. The feed spray nozzle assembly of claim 13 in which the supply of atomizing gas to which the atomizing gas passage of said second feed spray nozzle assembly is connected is a supply of steam.

19. The feed spray nozzle assembly of claim 13 in which said spray tip defines an internal mixing chamber, a bio-oil liquid directing nose disposed within said internal mixing chamber communicating with said bio-oil feed tube, said bio-oil liquid directing nose being formed with a plurality of radial discharge passages for transversely directing bio-oil directed through said bio-oil feed tube radially outwardly into said internal mixing chamber for break up and atomization of by atomizing gas directed from said atomizing gas passage into said internal mixing chamber.

20. The feed spray nozzle assembly of claim 13 in which said spray tip is formed with longitudinally extending cooling channels about its periphery communicating with the atomizing gas supply for directing atomizing gas about the spray tip for cooling the spray tip from radiation of hot catalyst.

\* \* \* \* \*